Figure 1:
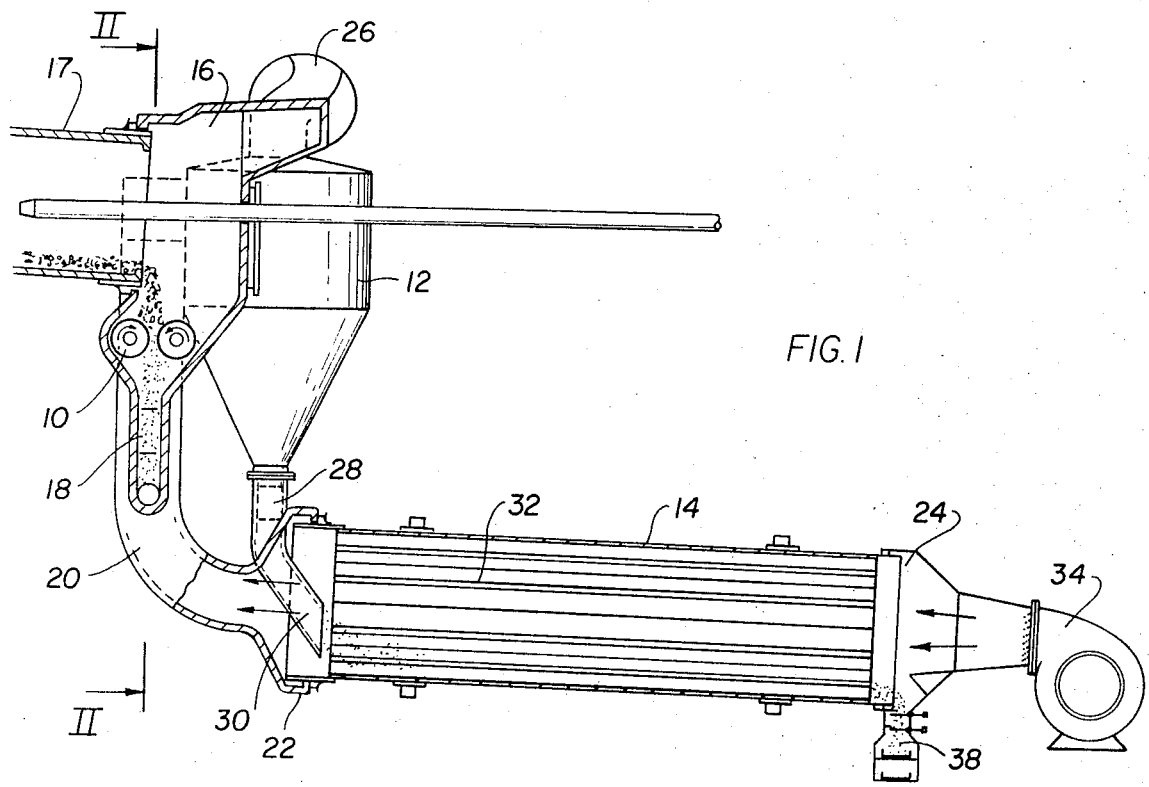

United States Patent [19]
Chielens

[11] 3,840,334
[45] Oct. 8, 1974

[54] COOLING GRANULAR MATERIAL

[75] Inventor: Alain Chielens, Marcq-en-Baroeul, France

[73] Assignee: Fives-Cail Babcock, Paris, France

[22] Filed: Aug. 6, 1973

[21] Appl. No.: 385,975

[30] Foreign Application Priority Data
Aug. 2, 1972  France .............. 72.27812

[52] U.S. Cl. .................. 432/80, 432/106
[51] Int. Cl. ............................ F27b 7/02
[58] Field of Search ........... 432/8, 80, 106, 103; 241/DIG. 8, DIG. 13

[56] References Cited
UNITED STATES PATENTS

| | | | |
|---|---|---|---|
| 2,587,378 | 2/1952 | Petersen | 432/78 |
| 2,879,052 | 3/1959 | Azbe | 432/80 |
| 2,987,306 | 6/1961 | Petersen | 432/80 |
| 3,089,688 | 5/1963 | Ostberg | 34/5 |

Primary Examiner—John J. Camby
Attorney, Agent, or Firm—Kurt Kelman

[57] ABSTRACT

Hot cement clinker coming from a kiln outlet passes through a crusher disposed at the outlet to a rotary cooling tube receiving hot, crushed clinker. A heat exchanger is arranged between the crusher and the cooling tube to receive substantially parallel countercurrent currents of cool air from the cooling tube and the granular material suspended in the air currents is passed into the separator, the separated air being delivered directly into the kiln while the separated clinker is delivered into the cooling tube.

8 Claims, 2 Drawing Figures

PATENTED OCT 8 1974 3,840,334

COOLING GRANULAR MATERIAL

The present invention relates to improvements in an installation for cooling granular material, such as cement clinker coming from a kiln outlet and passing through a crusher disposed at the kiln outlet to a cooling device receiving crushed material from the crusher. In the installation of this invention, the granular material is cooled by contact with fresh air and at least a portion of the fresh air is returned to the kiln as secondary air after it has absorbed a part of the heat of the granular material in a heat exchanger. The crushed clinker is cooled to the desired temperature in the cooling device.

It is the primary object of the invention to provide an installation of this general type which has a high thermal efficiency, i.e., rapid cooling and high recovery of heat.

The above and other objects are accomplished in accordance with the present invention with a heat exchanger mounted between the crusher and the cooling device. The heat exchanger is arranged to receive substantially parallel currents of cool air from the cooling device and to suspend the hot, crushed granular material passing from the crusher into the heat exchanger in the cool air currents. A separator is connected to the heat exchanger. The separator has an inlet receiving the cool air and the crushed material suspended therein for separating the air from the material, and outlet means connected to the kiln for delivering the separated air therefrom directly into the kiln while the separated material is delivered to the cooling device.

Figure 2:
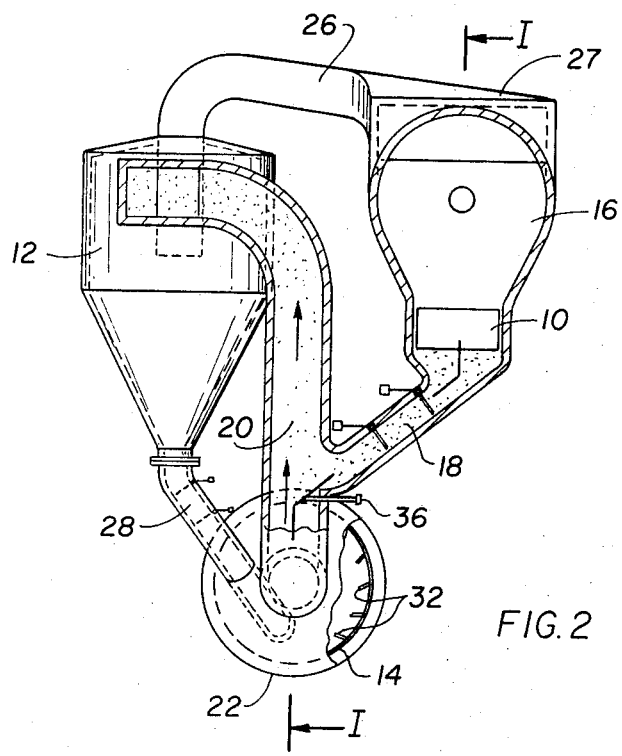

The above and other objects, advantages and features of this invention will become more apparent from the following detailed description of a now preferred embodiment thereof, taken in conjunction with the accompanying drawing wherein FIG. 1 is a side elevational view, partly in section along line I—I of FIG. 2, of the installation; and FIG. 2 is a section along line II—II of FIG. 1.

Referring now to the drawing, there is shown a rotary kiln 17 having closed casing or hood 16 mounted over its outlet. A crusher comprised of a pair of slowly rotating crusher rolls 10, 10 is mounted in the lower part of the closed casing and the hot granular material coming through the outlet of the kiln is fed by gravity into the nip of the rolls where the material is crushed. The crusher rolls are air- or water-cooled and have suitable, meshing teeth for crushing the material to the desired size, the grain size being adjustable by adjusting the spacing between the crusher rolls.

The crushed material is gravity fed from the nip of rolls 10, 10 into a lock chamber 18 which carries dampers, the outlet of the lock chamber being connected to a lower portion of vertical conduit 20 whose base portion is connected to hood 22 constituting the inlet of cooling device 14 while its top portion is connected to the inlet of separator 12 which may take the form of a conventional cyclone separator.

In the illustrated embodiment, the separator is a cyclone with a vertical axis having an upper outlet delivering separated air through conduit 26 and main 27 into the top of closed casing 16 wherefrom it enters directly into the kiln. The lower outlet of the cyclone separator delivers the separated crushed material into the inlet 22 of the cooling device through lock chamber 28 which carries dampers and channel 30.

The cooling device is shown as a rotary tube 14 of large diameter and having an axis slightly inclined to the horizontal. The conventional means for rotating the tube about its axis and supporting the same includes a pair of gear drives 52, 52 supporting tube 14 on a support base, variable speed motor 40 having an output shaft connected to, and driving, one of the gear drives 52. A speed regulating device 42 is connected to electric motor 40 to enable the rotary speed of tube 14 to be adjusted to a desired value. Internal fins 32 are mounted in the tube so that the cooled therein is layered in substantially parallel currents. The tube is held between hoods 22 and 24 which are air-tightly attached to the inlet and outlet of the tube, respectively.

The output of ventilator or fan 34 is connected to the outlet of the cooling tube 14 to supply cooling air to the tube, the cooling air passing therethrough countercurrently to the crushed material.

The above-described installation operates as follows:

Hot clinker falls out of kiln 17 into the nip between crusher rolls 10, 10 where it is reduced to the desired granular size, for example less than 5 mm diameter, which permits the pneumatic transportation of the crushed clinker to separator 12.

After the crushed granular material has passed through lock chamber 18, which prevents the cooling air coming from tube 14 to enter directly into the hood 16 and thence into the kiln, it enters into conduit 20 which is a heat exchanger wherein the crushed material is entrained by air currents moving towards the inlet of separator cyclone 12.

The cooling air is received in the heat exchanger conduit 20 at the base thereof, a slidable gate 36 being mounted in the conduit just below the point of the introduction of the crushed material so that the speed of the entraining air may be increased at this point sufficiently to favor the upward movement of the material. If the grain sizes and the air speed in conduit 20 are properly chosen, only a small fraction of the granules will fall directly into the cooling device 14 without being entrained by the air current from the lower portion of conduit 20 into the separator 12.

In the heat exchanger 20 as well as in separator 12, the cooling air absorbs heat from the crushed granules and begins to warm up. The hot air leaving the upper outlet of cyclone 12 is delivered into closed hood 16 at the outlet of kiln 17 where it enters the kiln to operate as secondary air in the kiln.

This arrangement assures not only efficient cooling of the crushed granules suspended in the cooling air currents but also the delivery of purified air to the kiln.

The cooled clinker separated in cyclone 12 passes through lock chamber 28 and is guided by channel or chute 30 into the inlet of cooling device 14. The inclination of the cooling device and its rotation cause the clinker to be moved down the tube from inlet 22 towards outlet 24 where the cooled clinker is evacuated through lock chamber 38 mounted in hood 24.

While the crushed material is displaced through the length of the cooling tube 14, the countercurrently blown fresh air forced into the tube by fan 34 absorbs heat from the material and becomes gradually warmer. At the outlet of the cooling tube, the clinker may have a temperature about 40° to 50°C. above the ambient temperature.

Since the crushed material enters the cooling tube 14 already cooled, it is not necessary to provide the tube with a refractory lining. Therefore, it can be rotated more rapidly than conventional rotary cooling tubes whereby the heat exchange between the clinker and the cooling air is improved. It is possible, for instance, to rotate tube 14 at a speed equal to about 50 to 70 percent of the critical speed by operating regulator 42.

The diaphragm 50 of the fan 34 is adjusted so that the air pressure in the interior of cyclone 12 is equal to, or slightly below, atmospheric pressure. The diaphragm is adjusted automatically in response to, and as a function of, the air pressure in conduit 26. The fan 34 makes it possible to ease the load on the ventilator for the kiln. This control system comprises pressure gage 44 disposed in conduit 26, regulator 46 connected to the pressure gage and comparing the pressure in conduit 26 with an adjustable reference value, the resultant output signal, which is a function between the pressure in conduit 26 and the reference value, being delivered to pneumatic motor 48 actuating ventilator diaphragm 50 in response to the output signal of regulator 46.

What is claimed is:

1. In an installation for cooling granular material discharged from a kiln outlet, a crusher having inlet and outlet means, the crusher inlet means being connected to the kiln outlet to receive the material discharged from the kiln, and a cooling device having inlet and outlet means for the crushed material and for a cooling gas: a heat exchanger mounted between the crusher outlet means and the cooling device outlet means, a first conduit means connecting the cooling device outlet means to the heat exchanger whereby the heat exchanger receives a current of the cooling gas from the cooling device and a second conduit means connecting the crusher outlet means to the heat exchanger to suspend the hot, crushed granular material passing from the crusher into the heat exchanger in the cooling gas current; and a separator having an inlet, a third conduit means connecting the separator inlet to the heat exchanger, the separator inlet receiving the cooling gas and the crushed material suspended therein for separating the material from the gas; and a gas outlet means connected to the kiln for delivering the gas directly into the kiln while the separated material is delivered to the cooling device.

2. In the installation of claim 1, a closed casing connected to the kiln outlet and containing the crusher, the heat exchanger comprising a vertical conduit having a base portion connected to an inlet of the cooling device and a top portion connected to the inlet of the separator, a lock chamber connecting the crusher with a lower portion of the vertical conduit, and the separator outlet means including an outlet delivering the separated air into the kiln and an outlet delivering the separated material to the inlet of the cooling device.

3. In the installation of claim 1, the cooling device being a rotary tube.

4. In the installation of claim 3, fins in the interior of the cooling tube.

5. In the installation of claim 3, means for rotating the cooling tube at a speed equal to about 50 to 70 percent of the critical speed.

6. In the installation of claim 1, a ventilator whose output is connected to the outlet of the cooling device.

7. In the installation of claim 6, means for adjusting the input of the ventilator so that the air pressure in the separator is substantially equal to atmospheric pressure.

8. In the installation of claim 6, means for adjusting the input of the ventilator so that the air pressure in the separator is slightly below atmospheric pressure.

* * * * *